(12) United States Patent
Shen (10) Patent No.: US 11,572,989 B2
(45) Date of Patent: Feb. 7, 2023

(54) MULTIFUNCTIONAL SHELF FLOOR LAMP

(71) Applicant: Rongdong Shen, Guangdong (CN)

(72) Inventor: Rongdong Shen, Guangdong (CN)

( * ) Notice: Subject to any disclaimer, the term of this patent is extended or adjusted under 35 U.S.C. 154(b) by 0 days.

(21) Appl. No.: 17/403,891

(22) Filed: Aug. 17, 2021

(65) Prior Publication Data

US 2022/0381410 A1 Dec. 1, 2022

(30) Foreign Application Priority Data

May 25, 2021 (CN) .......................... 202121127733.3

(51) Int. Cl.
| | |
|---|---|
| *F21V 23/06* | (2006.01) |
| *H02J 50/10* | (2016.01) |
| *F21S 9/02* | (2006.01) |
| *H04W 4/80* | (2018.01) |
| *F21S 6/00* | (2006.01) |
| *F21V 33/00* | (2006.01) |
| *F21V 21/06* | (2006.01) |
| *F21V 23/04* | (2006.01) |
| *H04R 1/02* | (2006.01) |

(52) U.S. Cl.
CPC .............. *F21S 6/006* (2013.01); *F21V 21/06* (2013.01); *F21V 23/06* (2013.01); *F21V 33/0056* (2013.01); *H02J 50/10* (2016.02); *F21S 9/02* (2013.01); *F21V 23/04* (2013.01); *H04R 1/028* (2013.01); *H04W 4/80* (2018.02)

(58) Field of Classification Search
CPC ... F21S 6/006; F21S 9/02; H02J 50/10; F21V 21/06; F21V 23/06; F21V 33/0056; H04W 4/80; H04R 1/028
See application file for complete search history.

(56) References Cited

U.S. PATENT DOCUMENTS

2016/0198247 A1* 7/2016 Cheney ............... H04R 31/006
 381/334

FOREIGN PATENT DOCUMENTS

CN 202791574 U * 3/2013

* cited by examiner

*Primary Examiner* — Anabel Ton
(74) *Attorney, Agent, or Firm* — JCIP Global Inc.

(57) ABSTRACT

The present invention discloses a multifunctional shelf floor lamp, which can effectively improve the space utilization rate. The present invention comprises a lamp cap board, a mounting base is arranged under the lamp cap board, a right angle trapezoidal base is arranged at the rear of the mounting base, the inclined plane of the right angle trapezoidal base is towards the front end of the mounting base, the right angle trapezoidal base is provided with a USB/TYPE-C socket, a horn mesh and a switch, and the inclined plane of the right angle trapezoidal base is provided with a wireless charger; a baffle is arranged in front of the inclined plane of the right angle trapezoidal base. The present invention enables the equipment to integrate the functions of lighting, placing objects, playing music and charging mobile electronic devices at the same time, reduces excessive devices and is more practical and convenient.

8 Claims, 6 Drawing Sheets

MULTIFUNCTIONAL SHELF FLOOR LAMP

CROSS-REFERENCE TO RELATED APPLICATION

This application claims the priority benefit of China application serial no. 202121127733.3,filed on May 25, 2021. The entirety of the above-mentioned patent application is hereby incorporated by reference herein and made a part of this specification.

BACKGROUND

Technical Field

The present invention relates to a lamp, and particularly relates to a floor lamp with good lighting effect and audio functions.

Description of Related Art

The existing shelf floor lamp is generally equipped with lamps and storage platform. The light source arranged on the top shelf unit is used for lighting and the storage platform is used for placing objects and ornaments; its function is too single to meet the needs of some users, more diversified functions are needed to meet the increasing needs of modern.

SUMMARY

In view of the shortcomings of the prior art, the present invention discloses a multifunctional shelf floor lamp which no need to place a loudspeaker box separately and reduces excessive placement equipment, effectively and reasonably uses the space in the house, effectively improves space utilization rate, and integrates more complete functions in the equipment.

The specific technical features are as follows:

A multifunctional shelf floor lamp, which comprises a lamp cap shelf board, a mounting base is arranged under the lamp cap shelf board, the lamp cap shelf board is connected with the mounting base through the connecting uprights, a storage platform is arranged under the mounting base, and the mounting base is connected with the storage platform through the connecting uprights;

A right angle trapezoidal base is provided on the rear part of the top of the mounting base, the straight waist of the right angle trapezoidal base is located at the rear end of the mounting base, the inclined plane of the right angle trapezoidal base is toward the front end of the mounting base, and the right angle trapezoidal base is provided with a USB/TYPE-C socket, a horn mesh and a wireless charger; a baffle is arranged in front of the inclined plane of the right angle trapezoidal base, and a certain distance is arranged between the baffle and the bottom end of the inclined plane;

The right angle trapezoidal base is provided with an audio module, the USB/TYPE-C socket, wireless charger and audio module are electrically connected with a power supply, and the power bus is equipped with a switch; the audio module comprises a Bluetooth receiving module, a driving module and a loudspeaker box, the driving module comprises a rectifier filter circuit, a frequency conversion circuit, a high frequency transformer T1 and a rectifier circuit;

The main circuit of the audio module comprises the rectifier filter circuit, the input end of the rectifier filter circuit is connected with the AC input, the output end of the rectifier filter circuit is connected with the frequency conversion circuit, the frequency conversion circuit is connected to the rectification circuit through the high frequency transformer T1, the rectification circuit is connected with the Bluetooth receiving module and the audio output circuit, and the Bluetooth receiving module is connected with the loudspeaker box through an audio output circuit.

Furthermore, the wireless charger is arranged on the inclined plane of the right angled trapezoidal base, the middle part of the top of the right angled trapezoidal base is provided with the horn mesh, one side of the horn mesh is provided with the USB/TYPE-C socket, the other side of the horn mesh is provided with the switch, the loudspeaker box is arranged under the horn mesh, and the horn of the speaker faces the horn mesh; the USB/TYPE-C socket, wireless charger and audio module are electrically connected in parallel.

Furthermore, the rectifier filter circuit comprises a rectifier bridge DB1, the pin 1 of the rectifier bridge DB1 is connected to the phase line L of the AC input through the resistor FR1, and the pin 3 of the rectifier bridge DB1 is connected to the zero line N of the AC input;

The positive pole and negative pole of the polar capacitor CE1 are respectively connected with the V+ pin 2 and V− pin 4 of the rectifier bridge DB1; an inductance L1 is arranged between the positive poles of the polar capacitors CE1 and CE2, and an inductance L2 is arranged between the negative poles of the polar capacitors CE1 and CE2; the positive pole of the polar capacitor CE2 is connected with the primary winding pin 1 of the high frequency transformer T1; the negative pole of the polar capacitor CE2 is grounded.

Furthermore, the pin 4 of the power management chip U1 in the frequency conversion circuit is grounded through the resistor R6, and the pin 5 and pin 6 of the power management chip U1 are connected with the primary winding pin 2 of the high frequency transformer T1; the pin 1 of the power management chip U1 is connected to the primary winding pin 1 of the high frequency transformer T1 through the resistor R2 and R1; the capacitor C2 and one end of the inductor L3 connected in parallel is connected with the pin 1 of the power management chip U1 through the resistor R3 and the positive pole-negative pole of the diode D2, and the other end is grounded;

The pin 1 of the power management chip U1 is grounded through the capacitor CY3, the pin 2 of the power management chip U1 is grounded through the resistor R4, and pin 2 of the power management chip U1 is connected to the positive pole of the diode D2 through the resistor R5;

The resistor R9, R8 and diode D1 connected in parallel between the primary winding pin 1 and primary winding pin 2 of the high frequency transformer T1, the primary winding pin 1 of the high frequency transformer T1 is grounded through the capacitor CY1, and both ends of the resistor R9 are connected in parallel with the capacitor C1.

Furthermore, the positive pole of the diode D3 in the rectifier circuit is connected with the secondary pin 3 of the high frequency transformer T1, and the negative pole of the diode D3 is connected with the Bluetooth receiving module and audio output circuit; the secondary pin 4 of the high frequency transformer T1 is grounded, the two ends of the diode D3 are connected in parallel with the resistor R10 and capacitor C3, the negative pole of the diode D3 is grounded through the resistor R11, and the negative pole of the diode D3 is grounded through the positive pole-negative pole of the capacitor CE4.

Furthermore, the negative pole of the diode D3 in the rectifier circuit is connected with the pin 2 of the Bluetooth chip U5 in the Bluetooth receiving module, and the pin 2 of the Bluetooth chip U5 is grounded through the capacitor C4, the pin 3 of the Bluetooth chip U5 is grounded through the capacitor C5, the pin 4 of the Bluetooth chip U5 is grounded through the capacitor C6, and the pin 15 of the Bluetooth chip U5 is grounded through the capacitor C7; the pin 7 of the Bluetooth chip U5 is connected with the antenna through the capacitor C12; a crystal oscillator Y2 is connected in parallel between the pin 9 and pin 10 of the Bluetooth chip U5; the pin 16 of the Bluetooth chip U5 is connected to the pin 4 of the power amplifier U3 in the audio output circuit through the resistor R12 and capacitor C8.

Furthermore, the pin 8 and pin 5 of the power amplifier chip U3 in the audio output circuit are connected with the loudspeaker box, and the resistor R13 is connected in parallel between the pin 4 and pin 5 of the power amplifier chip U3; the negative pole of the diode D3 in the rectifier circuit is connected with the pin 6 of the power amplifier chip U3, the pin 1 and pin 7 of the power amplifier chip U3 are grounded, and the pin 2 and pin 3 of the power amplifier chip U3 are grounded through the capacitor C11.

Furthermore, a bottom sealing plate is provided under the right angle trapezoidal base, and the right angle trapezoidal base and the bottom sealing plate form a cavity; the front part of the mounting base is provided with a concave cavity for carrying objects, and the wireless charger is located in the middle part of the inclined plane; the mounting base is provided with at least one baffle, the baffle is located in front of the inclined plane of the right angle trapezoidal base, a certain distance is set between the adjacent baffles, and the height of the baffle is gradually increased; a storage bin is arranged under the mounting base.

In the present invention, the audio device is installed on the main shelf, so that the equipment integrates the functions of lighting, placing objects, playing music and charging mobile electronic devices (wireless charging and/or wired charging); its application makes the room more attractive and is more practical and convenient.

DESCRIPTION OF THE EMBODIMENTS

In order to further understand the features, technical means, specific purposes and functions of the present invention, the present invention is further described in detail in combination with the drawings and the detailed description of embodiments.

Figure 3:
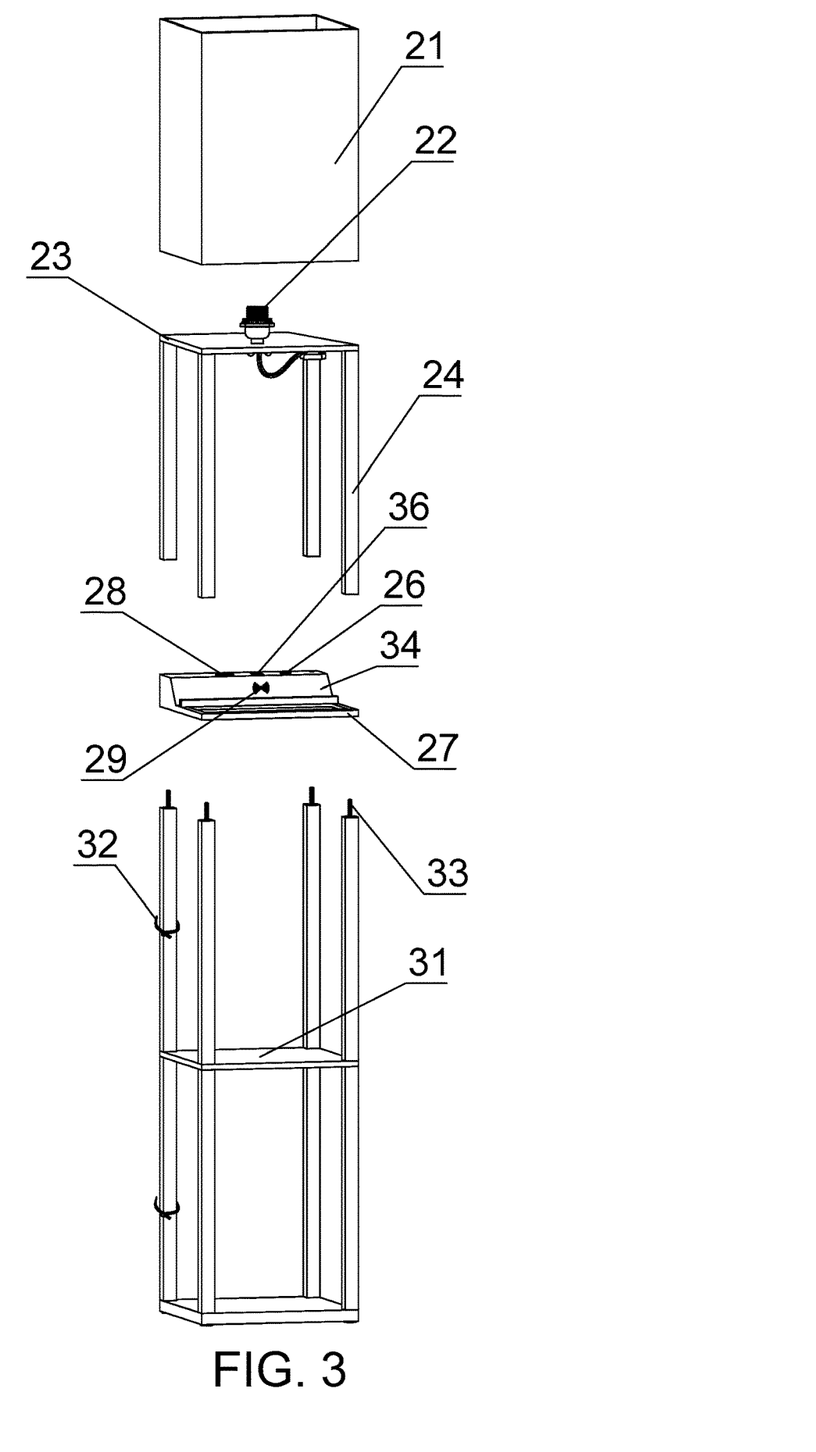
FIG. 3 is the structural diagram of the embodiment of the present invention.

Referring to the drawings, the present invention comprises a lampshade 21, a plurality of connecting uprights 24 and a plurality of storage platforms 31. A lampshade 21 is arranged on the top of the floor lamp, the lampshade 21 is arranged on the lamp cap board 23, the lamp cap base 22 is arranged on the lamp cap board 23, the lamp cap base 22 is located in the middle of the bottom of the lampshade 21, and a light is arranged on the lamp cap base 22. A mounting base 27 is arranged under the lamp cap board 23, and the lamp cap board 23 is connected with the mounting base 27 through the connecting uprights 24; at least one storage platform 31 is provided under the mounting base 27, preferably 2-3 storage platforms 31, each corner of the storage platform 31 is provided with a connecting upright 24, the mounting base 27 and the top storage platform 31 are connected by the connecting uprights 24, and the adjacent storage platforms 31 are connected by the connecting uprights 24; the ends of the connecting uprights 24 are provided with dowels 33 for connection, and the connecting uprights 24 are provided with a plurality of clamps 32.

Figure 1:
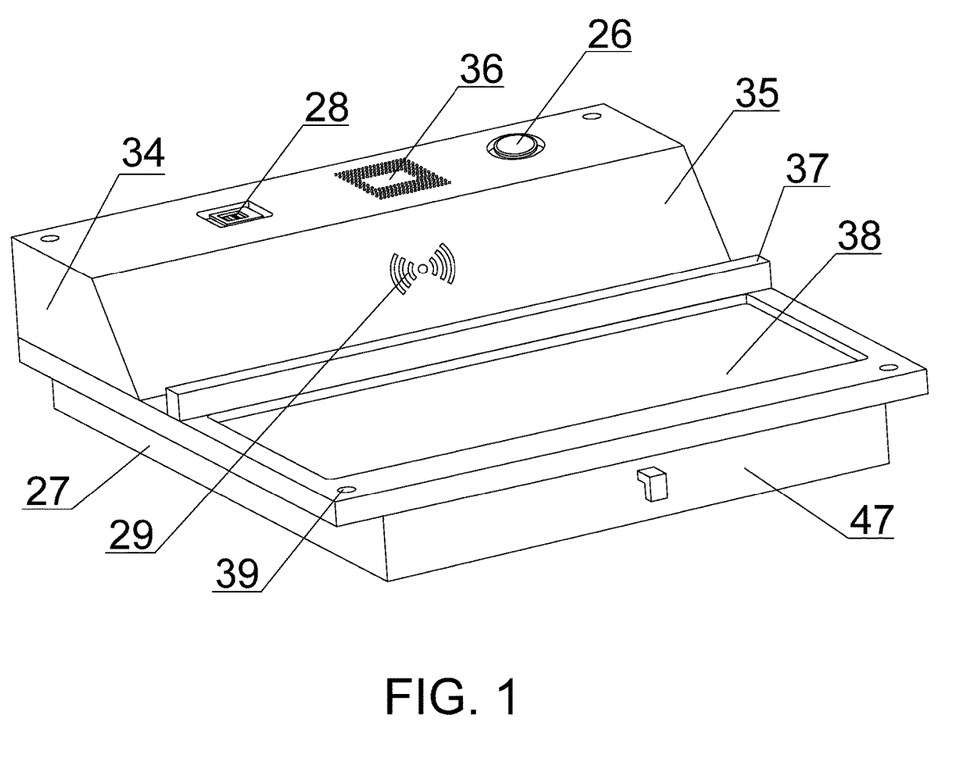
FIG. 1 is a schematic diagram of the mounting base in the embodiment of the present invention.
Figure 8:
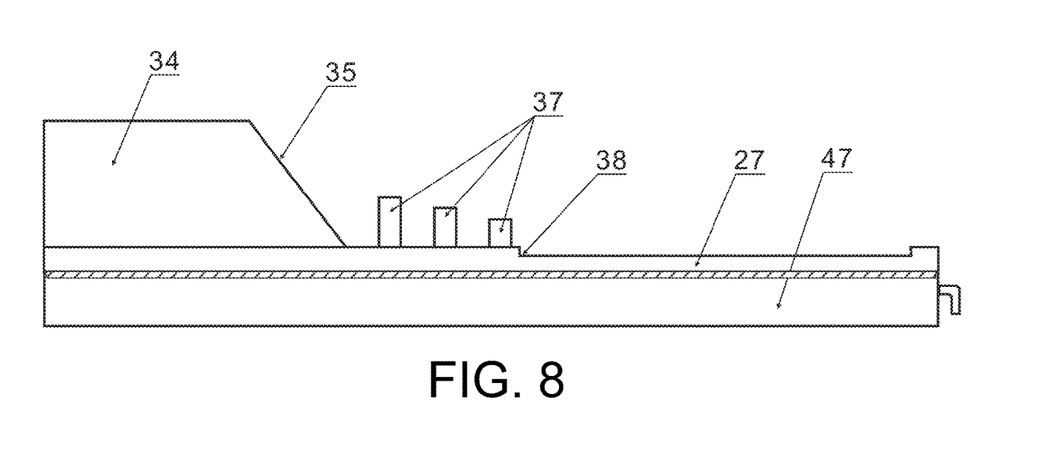
FIG. 8 is a side view of the mounting base in the embodiment of the present invention.

In some embodiments, the rear part of the top of the mounting base 27 is provided with a right angle trapezoidal base 34, the straight waist of the right angle trapezoidal base 34 is located at the rear end of the mounting base 27, the inclined plane 35 of the right angle trapezoidal base 34 is toward the front end of the mounting base 27, and the front part of the top of the mounting base 27 is provided with a concave cavity 38, the concave cavity 38 is used to prevent the objects from sliding. The right angle trapezoidal base 34 is provided with a USB/TYPE-C socket 28 (double hole USB), a horn mesh 36 and a switch 26, the switch 26 adopts a touch switch. The middle part of the inclined plane 35 of the right angle trapezoidal base 34 is provided with a wireless charger 29, the USB/TYPE-C socket 28 is used for wired charging of mobile electronic devices, and the wireless charger 29 is used for wireless charging of mobile electronic devices. A baffle 37 is arranged in front of the inclined plane 35 of the right angle trapezoidal base 34, and a certain distance is arranged between the baffle 37 and the bottom end of the inclined plane 35, the distance between the baffle 37 and the bottom end of the inclined plane 35 is convenient for the mobile electronic devices to be placed on the wireless charger 29, when charging, the baffle 37 contacts the bottom of the mobile electronic device, so that the mobile electronic device can be stably placed on the inclined plane 35 for charging.

Figure 7:
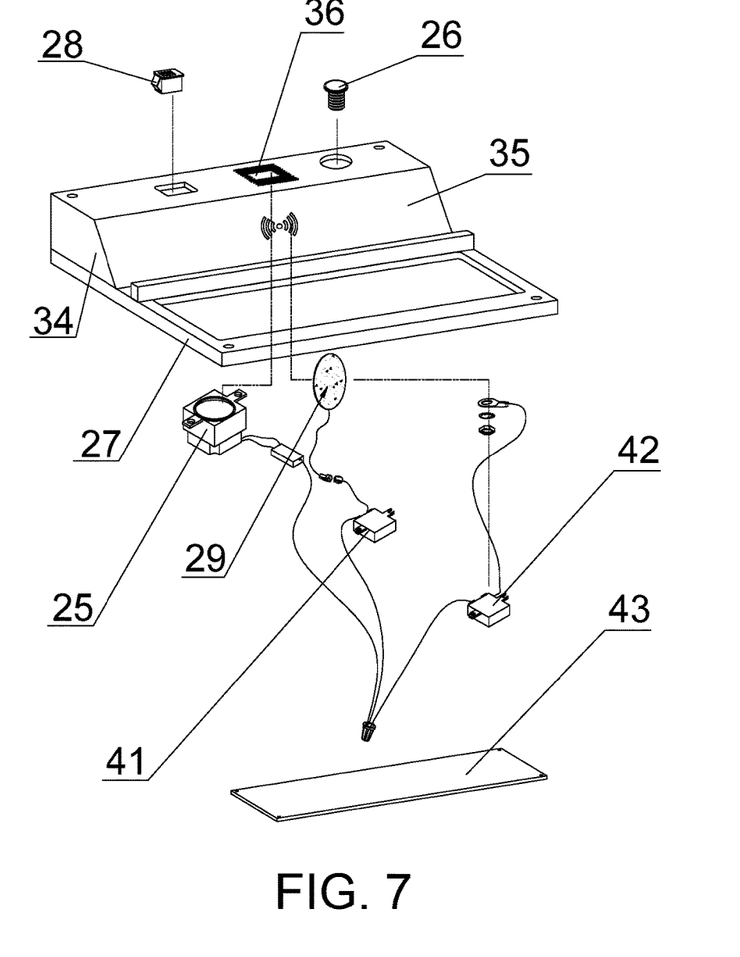
FIG. 7 is the assembly diagram of the mounting base in the embodiment of the present invention.

The corners of the mounting base 27 are provided with nail holes 39, the nail holes are matched with the dowels 33 at the end of the connecting uprights 24, so that the mounting base 27 can be connected with the connecting uprights 24 through the nail holes 39.

Figure 4:
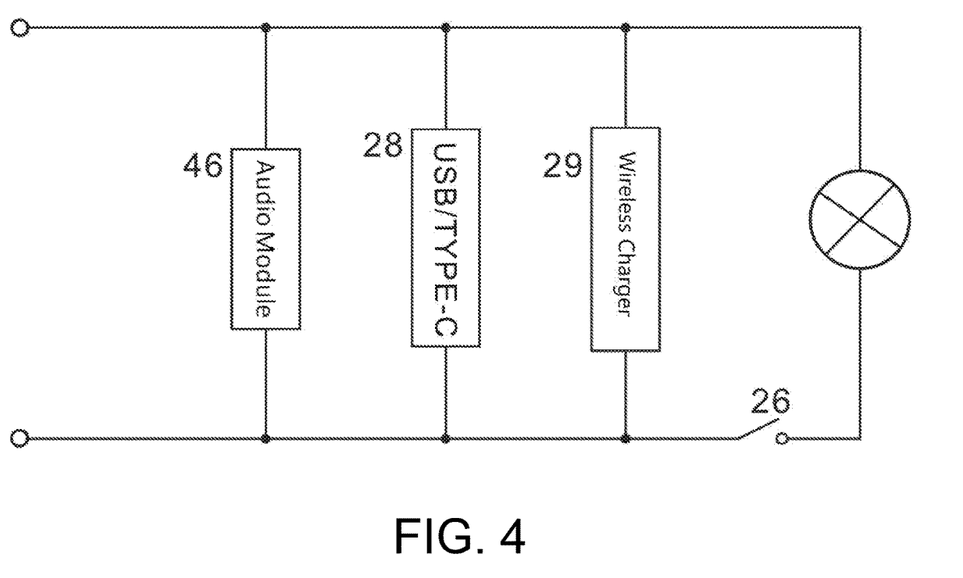
FIG. 4 is the general circuit diagram of the embodiment of the present invention.

The right angle trapezoidal base 34 is provided with an audio module 46, the USB/TYPE-C socket 28, the wireless charger 29, and the audio module 46 are electrically connected with the power supply, the USB/TYPE-C socket 28, the wireless charger 29 and the audio module 46 are connected in parallel, and the power bus is provided with a switch 26 and a lamp body (light), that is, the switch 26 is located on the main circuit of the power supply; the switch 26 controls the on-off of the entire circuit.

The middle part of the top of the right angle trapezoidal base 34 is provided with a horn mesh 36, one side of the horn mesh 36 is provided with the USB/TYPE-C socket 28, the other side of the horn mesh 36 is provided with the switch 26, a bottom sealing plate 43 is provided under the right angle trapezoidal base 34, the right angle trapezoidal base 34 and the bottom sealing plate 43 form a cavity, and in the cavity of the right angle trapezoidal base 34 is provided with the USB/TYPE-C socket 28, the wireless charger 29 and the audio module 46. A loudspeaker box 25 is arranged under the horn mesh 36, and the horn 52 of the loudspeaker box 25 faces the horn mesh 36.

Figure 2:
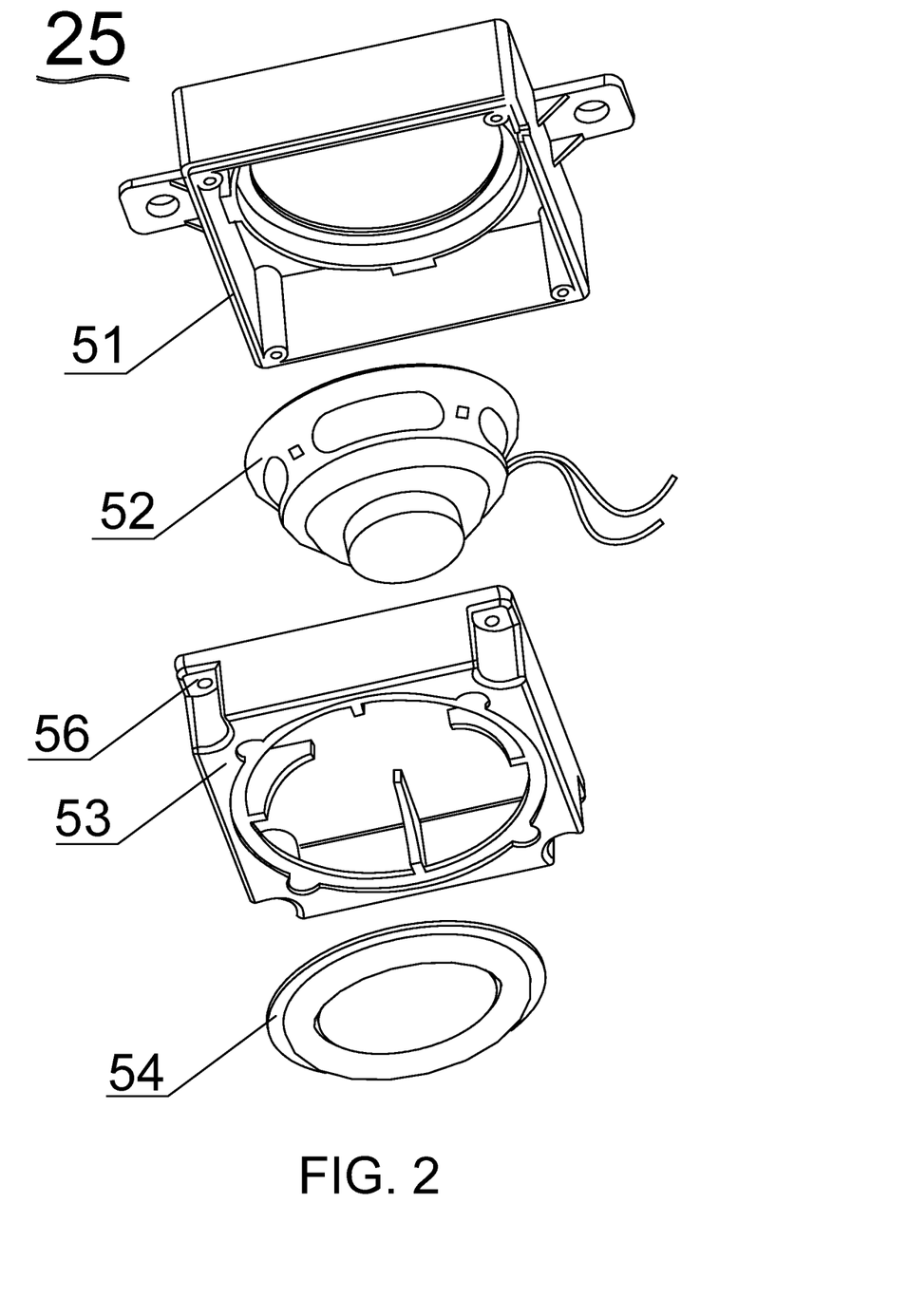
FIG. 2 is a schematic diagram of the loudspeaker box in the embodiment of the present invention.
Figure 5:
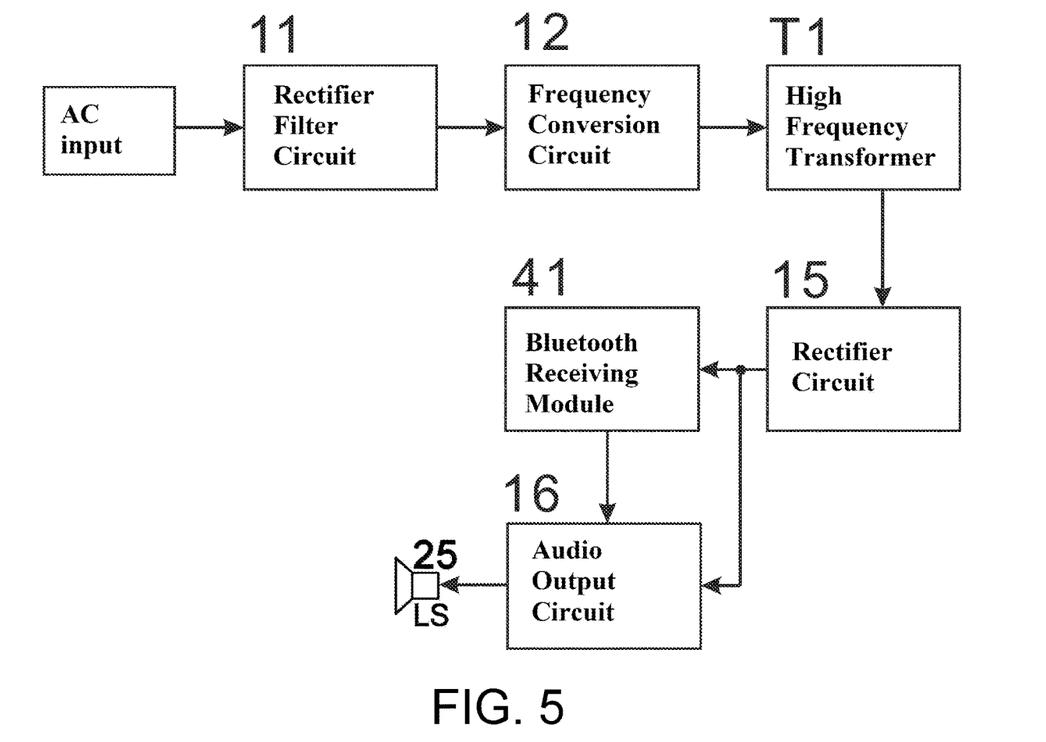
FIG. 5 is the circuit schematic diagram of the audio module in the embodiment of the present invention.

In some embodiments, the audio module 46 comprises a Bluetooth receiving module 41, a driving module 42, and a loudspeaker box 25 (LS), the driving module 42 comprises a rectifier filter circuit 11, a frequency conversion circuit 12, a high frequency transformer T1, and a rectifier circuit 15; the loudspeaker box 25 comprises an upper base 51, a horn 52, a lower base 53, a bottom fixing ring 54 and concave mounting grooves 56; the horn 52 is placed in the upper base 51, the back of the horn 52 is covered with the bottom fixing ring 54, the square lower base 53 is covered in the back of the horn 52, the four corners of the lower base 53 are provided with concave mounting grooves 56, the concave mounting grooves 56 are convenient for assembly with the upper base 51.

In some embodiments, the main circuit of the audio module 46 comprises the rectifier filter circuit 11, the input end of the rectifier filter circuit 11 is connected with AC input, the output end of the rectifier filter circuit 11 is connected with the frequency conversion circuit 12, the frequency conversion circuit 12 is connected with the rectifier circuit 15 through the high frequency transformer T1, the rectifier circuit 15 is connected with the Bluetooth receiving module 41 and the audio output circuit 16, and the Bluetooth receiving module 41 is connected with the loudspeaker box 25 through the audio output circuit 16.

Figure 6:
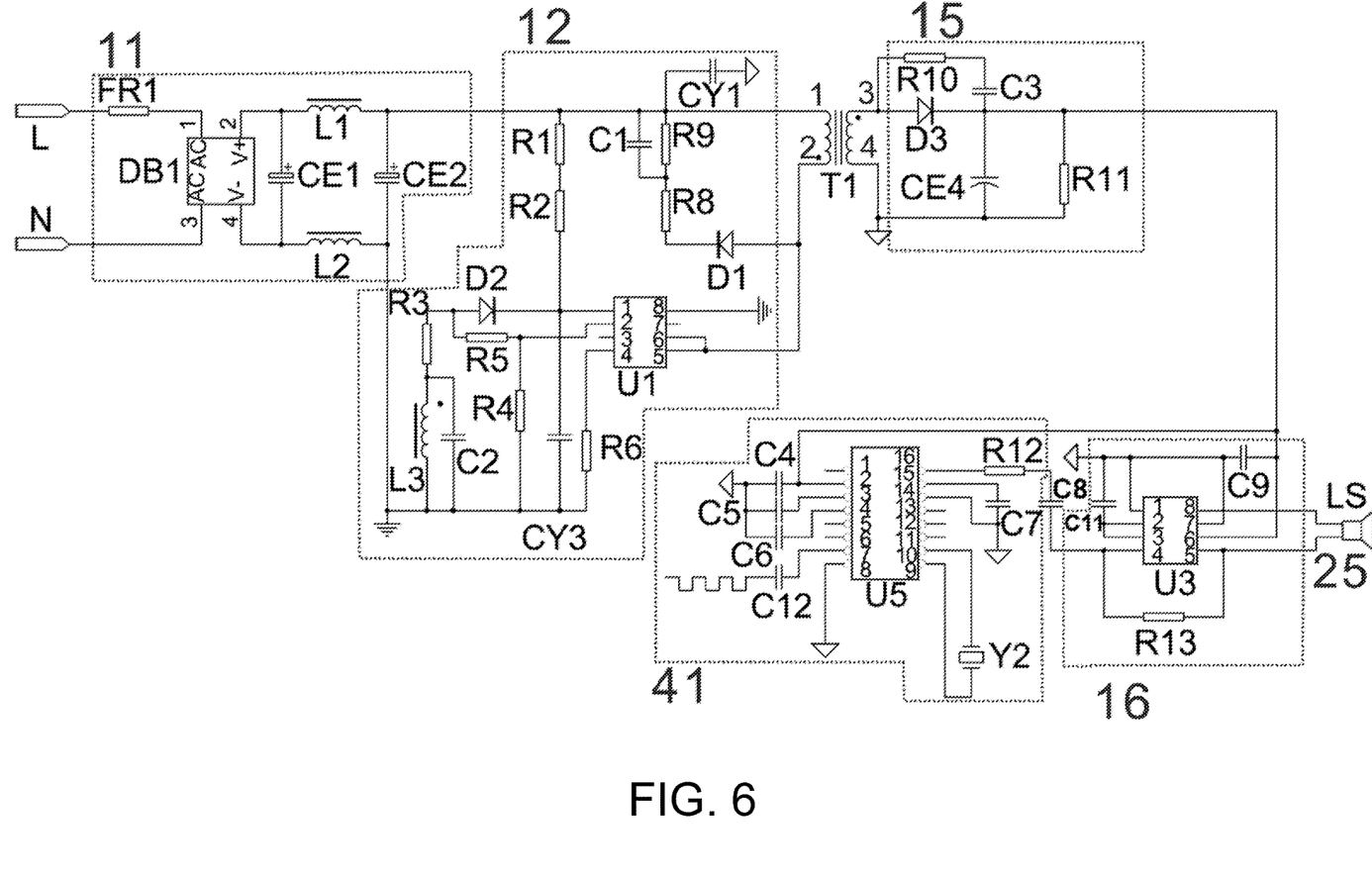
FIG. 6 is the electronic circuit diagram of the audio module in the embodiment of the present invention.

The rectifier filter circuit 11 comprises a rectifier bridge DB1, a pin 1 of the rectifier bridge DB1 is connected to the phase line L of the AC input through the resistor FR1, and the pin 3 of the rectifier bridge DB1 is connected to the zero line N of the AC input; a bridge arm circuit is composed of the inductance L1, polar capacitor CE1, inductance L2 and polar capacitor CE2, the positive pole of the polar capacitor CE1 is connected with the V+ pin 2 of the rectifier bridge DB1, and the negative pole of the polar capacitor CE1 is connected with the V− pin 4 of the rectifier bridge DB1; the inductance L1 is arranged between the positive poles of the polar capacitors CE1 and CE2, and the inductance L2 is arranged between the negative poles of the polar capacitors CE1 and CE2; the positive pole of the polar capacitor CE2 is connected with the primary winding pin 1 of the high frequency transformer T1, the negative pole of the polar capacitor CE2 is grounded; the polar capacitors CE1 and CE2 store and filter the rectified electric energy, and convert the input AC into DC.

In some embodiments, the pin 4 of the power management chip U1 in the frequency conversion circuit 12 is grounded through the resistor R6, and the pin 5 and pin 6 of the power management chip U1 are connected with the primary winding pin 2 of the high frequency transformer T1; the pin 1 of the power management chip U1 is connected with the inductance L1 of the rectifier filter circuit 11 through the resistor R2 and R1, and is connected with AC input through the rectifier filter circuit 11; the capacitor C2 and one end of the inductor L3 connected in parallel is connected with the pin 1 of the power management chip U1 through the resistor R3 and the positive pole-negative pole of the diode D2, and the other end is grounded.

The pin 1 of the power management chip U1 is grounded through the capacitor CY3, the pin 2 of the power management chip U1 is grounded through the resistor R4, and the pin 2 of the power management chip U1 is connected with the positive pole of the diode D2 through the resistor R5. The frequency conversion circuit 12 reverses the direct current into high frequency alternating current, and the power management chip U1 adjusts the frequency and phase-shifting angle of the frequency conversion circuit 12 in real time to accurately control the output power in real time.

The resistor R9, R8 and diode D1 are connected in parallel between primary winding pin 1 and primary winding pin 2 of the high frequency transformer T1, the primary winding pin 1 of the high frequency transformer T1 is grounded through the capacitor CY1, and the capacitor C1 is connected in parallel at both ends of the resistor R9; the high frequency transformer T1 transforms the input voltage into required voltage.

The diode D3 in the rectifier circuit 15 converts the increased alternating current into direct current; the positive pole of the diode D3 is connected with the secondary pin 3 of the high frequency transformer T1, and the negative pole of the diode D3 is connected with the Bluetooth receiving module 41 and audio output circuit 16; the secondary pin 4 of the high frequency transformer T1 is grounded, two ends of the diode D3 are connected with the resistor R10 and capacitor C3 in parallel, the negative pole of the diode D3 is grounded through the resistor R11, and the negative pole of the diode D3 is grounded through the positive pole-negative pole of the capacitor CE4.

The negative pole of the diode D3 in the rectifier circuit 15 is connected with the pin 2 of the Bluetooth chip U5 in the Bluetooth receiving module 41, and the pin 2 of the Bluetooth chip U5 is grounded through the capacitor C4, the pin 3 of the Bluetooth chip U5 is grounded through the capacitor C5, and the pin 4 of the Bluetooth chip U5 is grounded through the capacitor C6; the pin 7 of the Bluetooth chip U5 is connected with an antenna through the capacitor C12; the pin 15 of the Bluetooth chip U5 is grounded through the capacitor C7, and a crystal oscillator Y2 is connected in parallel between the pin 9 and pin 10 of the Bluetooth chip U5; the pin 16 of the Bluetooth chip U5 is connected to the pin 4 of the power amplifier chip U3 in the audio output circuit 16 through the resistor R12 and capacitor C8.

The pin 8 and pin 5 of the power amplifier chip U3 in the audio output circuit 16 are connected with the loudspeaker 25 box (LS), and the resistor R13 is connected in parallel between the pin 4 and pin 5 of the power amplifier chip U3; the negative pole of the Diode D3 in the rectifier circuit 15 is connected with the pin 6 of the power amplifier chip U3, the pin 1 and pin 7 of the power amplifier chip U3 are grounded, and the pin 2 and pin 3 of the power amplifier chip U3 are grounded through the capacitor C11.

At least one baffle 37 is arranged in front of the inclined plane 35 on mounting base 27, preferably 2-3 baffles 37. A certain distance is arranged between adjacent baffles 37, and baffles 37 are gradually raised in height (gradually increases), so that it is convenient for the storage or display of electronic products or other objects at intervals, and it is with the advantage of multi-function. A storage bin 47 is arranged under the mounting base 27, the storage bin 47 is a hanging cabinet with a front plate which can be turned over, or a drawer which is slidably connected, so as to store the objects that do not need to be displayed, improving the storage capacity of the present invention and making the structure of the present invention more compact and reasonable.

The present invention comprises a main shelf and a lamp body arranged on the main shelf, the lamp body is arranged on the lamp cap base 22, the main shelf comprises a lampshade 21, a lamp cap board 23, connecting uprights 24 and storage platforms 31, the main shelf is provided with a mounting base 27, and the mounting base 27 is provided with an audio module 46 (audio device), a wireless charger 29, a USB/TYPE-C socket 28 and a switch 26. In the present invention, the audio device is installed on the main shelf, so that the device integrates the functions of lighting, placing objects, playing music (supporting Bluetooth and answering calls on loudspeaker), wireless charging and wired charging of mobile electronic devices (such as mobile phone, iPad, etc.); avoids both of the floor lamp and loudspeaker box occupy the space, in addition, we can listen to music and charge the mobile electronic devices at the same time, so the functions are more complete.

The above-mentioned embodiments only express one implementing method of the present invention, and the description is specific and detailed, but it cannot be understood as a limitation on the patent scope of the present invention.

What is claimed is:

1. A multifunctional shelf floor lamp, which comprises a lamp cap board, wherein, a mounting base is arranged under the lamp cap board, the lamp cap board is connected with the mounting base through connecting uprights, a storage platform is arranged under the mounting base, and the mounting base is connected with the storage platform through the connecting uprights;
    the rear part of the top of the mounting base is provided with a right angle trapezoidal base, the straight waist of the right angle trapezoidal base is located at the rear end of the mounting base, the inclined plane of the right angle trapezoidal base is toward the front end of the mounting base, and the right angle trapezoidal base is provided with a USB/TYPE-C socket, a horn mesh and a wireless charger; a baffle is arranged in front of the inclined plane of the right angle trapezoidal base, and a certain distance is arranged between the baffle and the bottom end of the inclined plane;
    the right angle trapezoidal base is provided with an audio module, the USB/TYPE-C socket, the wireless charger, and an audio module are electrically connected with a power supply, and a power bus is equipped with a switch; the audio module comprises a Bluetooth receiving module, a driving module and a loudspeaker box; the driving module comprises a rectifier filter circuit, a frequency conversion circuit, a high frequency transformer and a rectifier circuit;
    a input end of the rectifier filter circuit is connected with a AC input; a output end of the rectifier filter circuit is connected with the frequency conversion circuit; the frequency conversion circuit is connected with the rectification circuit through the high frequency transformer; the rectifier circuit is connected with the Bluetooth receiving module and an audio output circuit; and the Bluetooth receiving module is connected with the loudspeaker box through the audio output circuit.

2. The multifunctional shelf floor lamp according to claim 1, wherein the wireless charger is arranged on the inclined plane of the right angled trapezoidal base, the middle part of the top of the right angled trapezoidal base is provided with the horn mesh, one side of the horn mesh is provided with the USB/TYPE-C socket, the other side of the horn mesh is provided with the switch, the loudspeaker box is arranged under the horn mesh, and the horn of the loudspeaker box faces the horn mesh; the USB/TYPE-C socket, the wireless charger and the audio module are electrically connected in parallel.

3. The multifunctional shelf floor lamp according to claim 1, wherein the rectifier filter circuit comprises a rectifier bridge, a first pin of the rectifier bridge is connected to a phase line of the AC input through a first resistor, and a third pin of the rectifier bridge is connected to a zero line of the AC input;
    the positive pole and negative pole of a first polar capacitor are respectively connected with a second pin and a fourth pin of the rectifier bridge; a first inductance is arranged between the positive poles of the first polar capacitor and a second polar capacitor, and a second inductance is arranged between the negative poles of the first polar capacitor and the second polar capacitor; the positive pole of the second polar capacitor is connected with a first primary winding pin of the high frequency transformer; the negative pole of the second polar capacitor is grounded.

4. The multifunctional shelf floor lamp according to claim 1, wherein a fourth pin of a power management chip in the frequency conversion circuit is grounded through a sixth resistor, and a fifth pin and a sixth pin of the power management chip are connected with a second primary winding pin of the high frequency transformer ; a first pin of the power management chip is connected to a first primary winding pin of the high frequency transformer through a second resistor and a first resistor; a second capacitor and one end of a inductor connected in parallel is connected to the first pin of the power management chip through a third resistor and the positive pole-negative pole of a second diode, and the other end is grounded;
    the first pin of the power management chip is grounded through a fourth capacitor, a second pin of the power management chip is grounded through a fourth resistor, and the second pin of the power management chip is connected to the positive pole of the second diode through a fifth resistor;
    an eighth resistor, a seventh resistor and a first diode are connected in parallel between the first primary winding pin and the second primary winding pin of the high frequency transformer, the first primary winding pin of the high frequency transformer is grounded through a third capacitor, and both ends of the eighth resistor are connected in parallel with a first capacitor.

5. The multifunctional shelf floor lamp according to claim 1, wherein the positive pole of a diode in the rectifier circuit is connected with a first secondary pin of the high frequency transformer , and the negative pole of the diode is connected with the Bluetooth receiving module and the audio output circuit; a second secondary pin of the high frequency transformer is grounded, the two ends of the diode are connected in parallel with a first resistor and a first capacitor, the negative pole of the diode is grounded through a second resistor, and the negative pole of the diode is grounded through the positive pole-negative pole of a second capacitor.

6. The multifunctional shelf floor lamp according to claim 1, wherein the negative pole of the diode in the rectifier circuit is connected with a first pin of a Bluetooth chip in the Bluetooth receiving module, and the first pin of the Bluetooth chip is grounded through a first capacitor, a second pin of the Bluetooth chip is grounded through a second capacitor, a third pin of the Bluetooth chip is grounded through a third capacitor, and a seventh pin of the Bluetooth chip is grounded through a fourth capacitor; a fourth pin of the Bluetooth chip is connected with an antenna through a sixth capacitor; a crystal oscillator is connected in parallel between a fifth pin and a sixth pin of the Bluetooth chip; after a resistor and a fifth capacitor, an eighth pin of the Bluetooth chip is connected to a first pin of a power amplifier in the audio output circuit.

7. The multifunctional shelf floor lamp according to claim 1, wherein an eighth pin and a fifth pin of a power amplifier chip in the audio output circuit are connected with the loudspeaker box, and a resistor is connected in parallel between a fourth pin and the fifth pin of the power amplifier chip; the negative pole of a diode in the rectifier circuit is connected with a sixth pin of the power amplifier chip, a first pin and a seventh pin of the power amplifier chip are grounded, and a second pin and a third pin of the power amplifier chip are grounded through a capacitor.

8. The multifunctional shelf floor lamp according to claim 1, wherein a bottom sealing plate is provided under the right angle trapezoidal base, and the right angle trapezoidal base and the bottom sealing plate form a cavity; the front part of the mounting base is provided with a concave cavity for carrying objects, and the wireless charger is located in the middle part of the inclined plane; the mounting base is provided with at least one baffle, the at least one baffle is located in front of the inclined plane of the right angle trapezoidal base, the certain distance is arranged between the at least one adjacent baffles, and the height of the at least one baffle is gradually increased; a storage bin is arranged under the mounting base.

\* \* \* \* \*